3,391,098
PRESSURE SENSITIVE ADHESIVE COMPRISING (A) COAL TAR PITCH, (B) COPOLYMER OF ACRYLONITRILE AND BUTADIENE, (C) POLYISOBUTYLENE, AND (D) FIBROUS HYDROUS MAGNESIUM SILICATE
Woodrow E. Kemp, Pittsburgh, Pa., assignor to Koppers Company, Inc., a corporation of Delaware
Filed Mar. 23, 1965, Ser. No. 442,073
6 Claims. (Cl. 260—28.5)

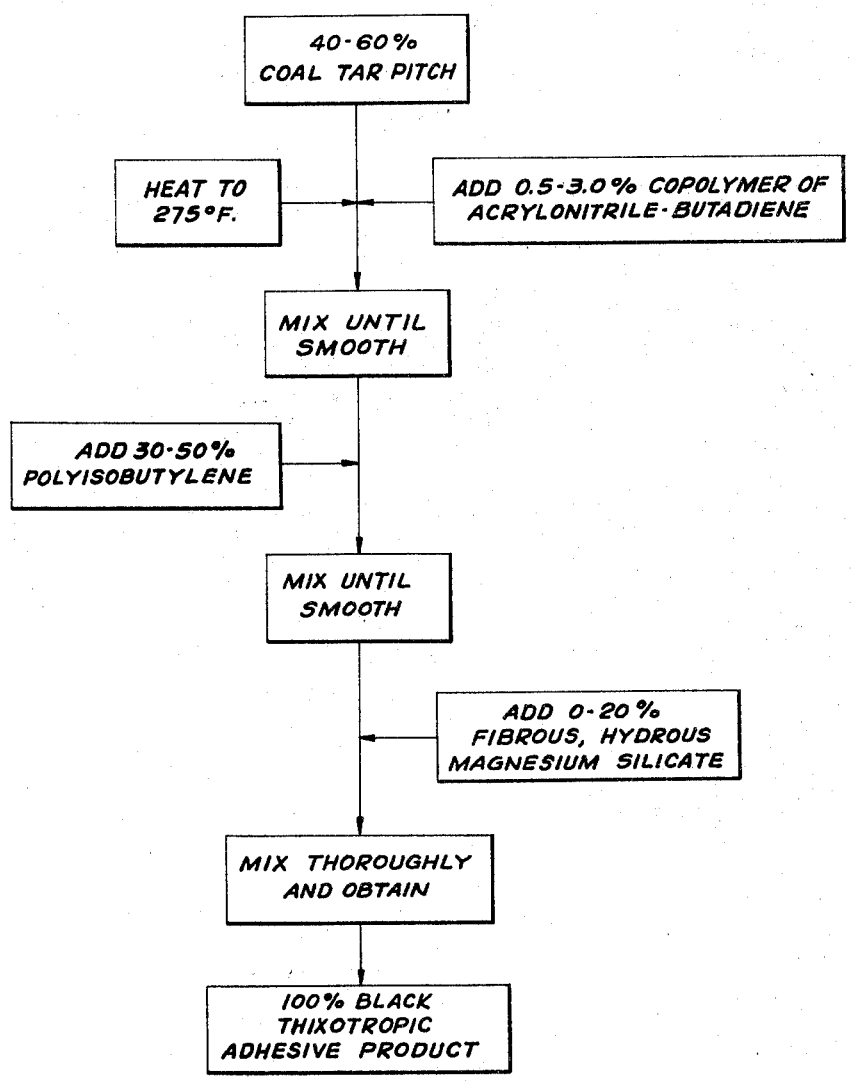

This invention relates to adhesives and, more particularly, to adhesives of the pressure-sensitive type.

Pressure responsive adhesives, which are sometimes referred to as pressure-sensitive adhesives, found wide acceptance in industry and are commonly used in the form of an adhesive tape. The function of such adhesives is of course to attach one adherend to another. When made in the form of adhesive tapes, the adhesive is generally applied to one surface of one adherend, be it cloth, paper, metal foil, or the like. When the tape is applied to another adherend, be it metal, wood, plastic, or the like, the two adherends securely adhere to each other.

Pressure responsive adhesives differ from other types in that they function immediately upon application without any physical or chemical change in the adhesive composition. They provide instantaneous adhesion and require only a slight pressure to form a strong bond between adherends.

I have found a novel pressure-sensitive adhesive of the coal tar variety which is especially suitable for bonding one adherend, such as metal, wood, plastics (coal tar products), to another adherend which may be either similar or dissimilar to the first adherend.

The drawing illustrates schematically the method steps to formulate the novel pressure-sensitive adhesive of the present invention and includes mixing the following ingredients in approximate proportions:

40-60 percent by weight of coal tar pitch having a Brookfield viscosity at 200° F. in the range of 100-400;
0.5-3.0 percent by weight of a copolymer of acrylonitrile and butadiene having a Mooney viscosity in the range of 25-175;
30-50 percent by weight of polyisobutylene having a molecular weight in the range of 7,000-15,000;
and not more than 20 percent by weight of a fibrous-magnesium silicate having a specific gravity of 2.5, an oil absorption in the range of 34-44, and a screen analysis wherein 50-60 percent pass through a U.S. standard No. 140 screen.

When these ingredients are mixed in the manner disclosed hereinafter, a novel, black, thixotropic adhesive product is produced.

For use in the present invention, a coal tar pitch having a ring and ball softening point between 80° and 200° F. (determined by ASTM specification D-36) is suitable. A ring and ball softening point below 80° F. renders the resulting composition too fluid for most applications. Moreover, such a coal tar pitch has too low a tensile strength to be suitable. A coal tar pitch having a ring and ball softening point above 200° F. is too hard, and it is too brittle at low temperatures. Moreover, the copolymer element is difficult to dissolve in the coal tar pitch. A coal tar pitch having a ring and ball softening point within the range of 120-130° F. is preferred. Such a pitch contributes greater adhesion and heat resistance to the final product.

I have found also that a coal tar pitch having a viscosity at 200° F. (Brookfield Viscometer No. 4 Spindle, 6 r.p.m.) in the range of 100-400 produces satisfactory results, and that such a pitch may be used in amounts between 40 and 60 percent by weight in the final mixture. If less than 40 percent by weight is used, the resulting adhesive is too soft and is too tacky. This means that it cannot be readily handled and a conventional release paper applied thereto cannot be removed quickly. If more than 60 percent is used the resulting adhesive does not have a proper initial contact adhesion. When between 40 and 60 percent by weight of the adhesive is coal tar pitch, the resulting adhesive: achieves an optimum initial contact adhesion, has a preferred tensile strength, and has a desirable usefulness over the widest posible ambient temperature range.

The copolymer of acrylonitrile and butadiene is comprised of a major portion of butadiene and a minor portion of acrylonitrile. Such copolymers are commercially available and carry a United States Government designation "GR-A." For use with this invention, a copolymer comprised of from 51-80 percent by weight of butadiene and from 49-20 percent by weight of acrylonitrile is advantageous. If the copolymer has a greater acrylonitrile content, it is difficult to dissolve the copolymer in the tar; and if the copolymer has a lesser acrylonitrile content, solution of the copolymer in the tar is easier but the formulation becomes more susceptible to attack by solvents. If less than 0.05 percent by weight of copolymer is used, the copolymer is ineffective because of the very minute quantity present. If more than 3.0 percent copolymer is used, the tackiness of the adhesive is too great for practical applications.

The polyisobutylene may have a molecular weight in the range of 7,000-15,000; and in the final mixture, the quantity thereof may be in the range of 30-50 percent by weight. However, in a preferred embodiment of the invention, the molecular weight of the polyisobutylene is selected from the range of 10,000-12,000. If the molecular weight of the polyisobutylene is below 7,000, the adhesive formulation tends to have semi-liquid flow properties. That is to say, the adhesive tends to have too much cold flow for satisfactory adhesion to vertical surfaces. If the molecular weight is greater than 15,000, the polyisobutylene is not compatible with the coal tar and does not mix with the coal tar ingredient.

The fibrous, hydrous magnesium silicate has preferably a specific gravity of about 2.5, and oil absorption in the range of 34-44, and a particle size such that between 50 and 60 percent thereof passes a standard U.S. No. 140 screen. A typical chemical analysis of a suitable fibrous, hydrous magnesium silicate is: 37.5 percent $SiO_2$; 0.5 percent $Al_2O_3$; 3.9 percent $Fe_2O_3$; 2.2 percent FeO; 42.2 percent MgO; and 13.7 percent $H_2O$; making a total of 100 percent.

In a preferred embodiment of the invention, the quantity of magnesium silicate is about 10 percent by weight of the adhesive composition. In some applications, where the adhesive is to be applied to substantially horizontal surfaces at room temperature, the magnesium silicate may be eliminated entirely. However, whenever the adhesive is to be applied to substantially vertical surfaces, it is desirable to use approximately 10 percent by weight of the magnesium silicate in the final composition. The magnesium silicate imparts flow retarding properties to the adhesive and reduces the tendency for the adhesive to develop cold flow properties. If more than 20 percent by weight of magnesium silicate is used, the viscosity of the final mixture is too high and the adhesive is difficult to spread as a thin film on an adhesive tape, for example.

With respect to the screen analysis and particle size of the magnesium silicate, if the particle sizes are too large, they tend to wick water into the adhesive. Likewise, if the particles are too small, the magnesium silicate particles do not interlock and the strength of the adhesive product is reduced. These limitations are critical as no other type of magnesium silicate has been found to provide the proper reinforcing properties and to provide the proper elasticity at low temperatures.

As an illustration of the invention, forty-eight and one-half parts by weight of coal tar pitch (having a viscosity of 275 at 200° F. using a Model LVF Brookfield Viscometer No. 4 Spindle at 6 r.p.m.) was placed in a suitable vessel and heated to 275° F. To this, with good mixing, was added at this temperature one and one-half parts by weight of a copolymer of acrylonitrile and butadiene (49–20 percent acrylonitrile and 51–80 percent butadiene) (having a Mooney viscosity of between 45 and 100). After the copolymer had been dispersed or dissolved and the coal tar pitch mixture was homogeneous and free of lumps, 40 parts by weight of polyisobutylene (having a molecular weight between 10,000 and 12,000) was added and mixed with the other mixture. When the coal tar mixture had again become a smooth homogeneous product, 10 parts by weight of a fibrous, hydrous magnesium silicate (having a specific gravity of approximately 2.5, an oil absorption between 34 and 44, and a particle size such that between 50 and 60 percent passes through a standard U.S. No. 140 screen) was added, and the whole composition was throughly mixed to obtain a smooth, homogeneous, thixotropic black product.

The product is thixotropic in that the viscosity of the final product varies somewhat within the formulations ranges and varies with the degree of mixing. Typically, the viscosity measured by a Brookfield Viscometer (Model LVF and a No. 6 Spindle) at 275° F., operating at 10 r.p.m., is 40,000 centipoises; whereas, when operating at 20 r.p.m., the viscosity is 25,000 centipoises. The viscosity has been known to vary between 60,000 centipoises at 10 r.p.m. and 20,000 centipoises at 20 r.p.m.

The foregoing novel coal tar adhesive formulation is suitable for adhering coal tar products and plastics to metal such as steel, concrete, and wood, and the composition is stable to 400° F. Furthermore, the novel adhesive formulation is flexible and maintains its preferred contact and adhesive qualities indefinitely when exposed to air.

The formulation defines the usual range of quantities which provides the degree of contact adhesiveness and strength desired in a commercial product. Within the formulation ranges described, the product will stick to all known materials at temperatures over 150° F. Above a temperature of 400° F. depolymerization occurs, and below 150° F. it has been found that the adhesive will not stick to silicone type surfaces.

The adhesive of the present invention is applicable for many purposes and may be applied to various substrates in conventional ways. A common example of its use is to coat a tape-form of substrate and the adhesive may be readily applied to such substrates by means of conventional knife coaters or other suitable apparatus. Normally the adhesive product will be easy to apply, but whenever the viscosity of the adhesive is unsuitable, the adhesive may be heated during application to thin it, or it may be cooled to thicken it. When properly prepared and applied, the adhesive exhibits excellent strength and durability properties while concurrently maintaining desirable elastic and tackiness properties required for various uses.

As an example of the tackiness or tack adhesion of the adhesive of the present invention, a substrate was coated with the adhesive and a similar substrate was placed upon the first substrate. A uniformly distributed load of three-quarters of a pound per square inch was then applied to the upper substrate for a period of thirty seconds time. It required a force of about 1.65 pounds per inch width of substrate to separate the two substrates.

A second similar test showed that when a uniform loading of one and one-half pounds per square inch was applied for a period of fifteen minutes time, it required a force of about 4.40 pounds per inch width of substrate to separate the two substrates.

Such examples of tack adhesion indicate that the adhesive product of the present invention has very desirable bonding properties and that such adhesive product has a wide applicability in industry.

I claim:

1. An adhesive composition of the pressure-sensitive type comprising:
   (a) coal tar pitch in quantity amounting to between 40 and 60 percent by weight of the adhesive composition and having a Brookfield viscosity at 200° F. in the range of 100–400;
   (b) a copolymer comprised of from 49–20 percent by weight of acrylonitrile and from 51–80 percent by weight of butadiene in quantity amounting to between 0.5 and 3.0 percent by weight of the adhesive composition and having a Mooney viscosity in the range of 25–175;
   (c) polyisobutylene in quantity amounting to between 30 and 50 percent by weight of the adhesive composition and having a molecular weight in the range of 7,000–15,000; and
   (d) fibrous, hydrous magnesium silicate in quantity amounting to between zero and 20 percent by weight of the adhesive composition and having a specific gravity of about 2.5, an oil absorption in the range of 34–44, and a particle size such that between 50 and 60 percent passes through a U.S. standard No. 140 screen.

2. An adhesive composition of the pressure-sensitive type comprising:
   (a) coal tar pitch in quantity amounting to between 40 and 60 percent by weight of the adhesive composition and having a Brookfield viscosity at 200° F. in the range of 100–400;
   (b) a copolymer comprised of from 49–20 percent by weight of acrylonitrile and from 50–80 percent by weight of butadiene in quantity amounting to between 0.5 and 3.0 percent by weight of the adhesive composition and having a Mooney viscosity in the range of 25–175;
   (c) polyisobutylene in quantity amounting to between 30 and 50 percent by weight of the adhesive composition and having a molecular weight in the range of 7,000–15,000; and
   (d) fibrous hydrous magnesium silicate in quantity amounting to between zero and 20 percent by weight of the adhesive composition and having a chemical analysis: 37.5 percent $SiO_2$, 0.5 percent $Al_2O_3$, 3.9 percent $Fe_2O_3$, 2.2 percent FeO, 42.2 percent MgO, and 13.7 percent $H_2O$, and having a specific gravity of about 2.5, an oil absorption in the range of 34–44, and a particle size such that between 50 and 60 percent passes through a U.S. standard No. 140 screen.

3. An adhesive composition of the pressure-sensitive type comprising:
   (a) 48 parts by weight of coal tar pitch at 275° F. having a Brookfield viscosity at 200° F. of 275;
   (b) 1.5 parts by weight of a copolymer comprised of from 49–20 percent by weight of acrylonitrile and from 51–80 percent by weight of butadiene having a Mooney viscosity in the range of 45–100;
   (c) 40 parts by weight of polyisobutylene having a molecular weight in the range of 10,000–12,000; and
   (d) 10 parts by weight of fibrous hydrous magnesium silicate having a specific gravity of approximately 2.5, an oil absorption in the range of 34–44, and a screen analysis whereby between 50 and 60 percent passes through a U.S. standard No. 140 screen.

4. The preparation of an adhesive composition of the pressure-sensitive type comprising the steps of:
   (a) heating to 275° F. a quantity of coal tar pitch amounting to between 40 and 60 percent by weight of the adhesive composition and having a Brookfield viscosity at 200° F. in the range of 100–400;

(b) adding to and mixing with said coal tar pitch at 275° F. a quantity of a copolymer comprised of from 49–20 percent by weight of acrylonitrile and from 51–80 percent by weight of butadiene amounting to between 0.5 and 3.0 percent by weight of the adhesive composition and having a Mooney viscosity in the range of 25–175, until said copolymer is dispersed or dissolved and the mixture is homogeneous and free of lumps;

(c) adding to said mixture and mixing therewith a quantity of polyisobutylene amounting to between 30 and 50 percent by weight of the adhesive composition and having a molecular weight in the range of 10,000–12,000, until the mixture is smooth again; and (d) adding to the mixture and thoroughly mixing therewith a quantity of fibrous hydrous magnesium silicate amounting to between zero and 20 percent by weight of the adhesive composition and having a specific gravity of about 2.5, an absorption in the range of 34–44, and a particle size such that between 50 and 60 percent thereof passes through a U.S. standard No. 140 screen, until a smooth thixotropic product is produced.

5. The method of preparation of an adhesive composition of the pressure-sensitive type comprising the steps of:

(a) heating to 275° F. a quantity of coal tar pitch amounting to between 40 and 60 percent by weight of the adhesive composition and having a Brookfield viscosity at 200° F. in the range of 100–400;

(b) adding to and mixing with said coal tar pitch at 275° F. a quantity of a copolymer comprised of from 49–20 percent by weight of acrylonitrile and from 51–80 percent by weight of butadiene amounting to between 0.5 and 3.0 percent by weight of the adhesive composition and having a Mooney viscosity in the range of 25–175, until said copolymer is dispersed or dissolved and the mixture is homogeneous and free of lumps;

(c) adding to said mixture and mixing therewith a quantity of polyisobutylene amounting to between 30 and 50 percent by weight of the adhesive composition and having a molecular weight in the range of 10,000–12,000, until the mixture is smooth again; and (d) adding to the mixture and thoroughly mixing therewith a quantity of fibrous hydrous magnesium silicate amounting to between zero and 20 percent by weight of the adhesive composition and having a chemical analysis: 37.5 percent $SiO_2$, 0.5 percent $Al_2O_3$, 3.9 percent $Fe_2O_3$, 2.2 percent FeO, 42.2 percent MgO, and 13.7 percent $H_2O$, and having a specific gravity of about 2.5, an oil absorption in the range of 34–44, and a particle size such that between 50 and 60 percent thereof passes through a U.S. standard No. 140 screen until a smooth thixotropic product is produced.

6. The method of preparation of an adhesive composition of the pressure-sensitive type comprising the steps of:

(a) heating to 275° F. 48.5 parts by weight of coal tar pitch having a Brookfield viscosity at 200° F. of 275;

(b) adding to and mixing with said coal tar pitch at 275° F. 1.5 parts by weight of a copolymer comprised of from 49–20 percent by weight of acrylonitrile and from 51–80 percent by weight of butadiene having a Mooney viscosity in the range of 45–100, until said copolymer is dispersed or dissolved and the mixture is homogeneous and free of lumps;

(c) adding to said mixture and mixing therewith 40 parts by weight of polyisobutylene having a molecular weight of in the range of 10,000–12,000, until the mixture is smooth again; and (d) adding to the mixture and thoroughly mixing therewith 10 parts by weight of fibrous hydrous magnesium silicate, having a specific gravity of about 2.5, an oil absorption in the range of 34–44, and a particle size such that between 50 and 60 percent passes through a U.S. standard No. 140 screen, until a smooth thixotropic product is produced.

References Cited

UNITED STATES PATENTS

| | | | |
|---|---|---|---|
| 2,142,039 | 12/1936 | Abrams et al. | 260—28.3 |
| 2,331,979 | 10/1943 | Henderson | 260—28.5 |
| 2,484,060 | 10/1949 | Wing | 260—28.5 |
| 3,111,787 | 11/1963 | Chamberlain | 260—26.5 |

MORRIS LIEBMAN, *Primary Examiner.*